(12) United States Patent
Soriano et al.

(10) Patent No.: US 11,711,358 B2
(45) Date of Patent: Jul. 25, 2023

(54) EXPEDITED USER AUTHENTICATION

(71) Applicant: Disney Enterprises, Inc., Burbank, CA (US)

(72) Inventors: Joseph Ungos Soriano, Manhattan Beach, CA (US); Thomas Michael LeBeau, Plantsville, CT (US)

(73) Assignee: Disney Enterprises, Inc., Burbank, CA (US)

( * ) Notice: Subject to any disclaimer, the term of this patent is extended or adjusted under 35 U.S.C. 154(b) by 241 days.

(21) Appl. No.: 16/789,061

(22) Filed: Feb. 12, 2020

(65) Prior Publication Data
US 2021/0250343 A1 Aug. 12, 2021

(51) Int. Cl.
H04L 29/06 (2006.01)
G06F 21/46 (2013.01)
H04L 9/40 (2022.01)
G06F 21/42 (2013.01)

(52) U.S. Cl.
CPC .......... H04L 63/0853 (2013.01); G06F 21/42 (2013.01); H04L 63/083 (2013.01); H04L 63/0861 (2013.01); H04L 63/102 (2013.01); H04L 63/18 (2013.01)

(58) Field of Classification Search
CPC .......... G06F 21/42; G06F 21/35; G06F 21/43; G06F 21/305; H04L 63/18; H04L 63/0853; H04L 63/083; H04L 63/0861; H04L 63/102
See application file for complete search history.

(56) References Cited

U.S. PATENT DOCUMENTS

| | | | | |
|---|---|---|---|---|
| 11,004,084 | B1 * | 5/2021 | Krausz | G06Q 20/405 |
| 11,051,163 | B1 * | 6/2021 | Smith | H04L 63/0876 |
| 11,057,375 | B1 * | 7/2021 | Conley | H04L 63/0853 |
| 2008/0086770 | A1 * | 4/2008 | Kulkarni | H04L 9/3271 |
| | | | | 726/20 |
| 2014/0282882 | A1 * | 9/2014 | Tsui | G06F 21/10 |
| | | | | 726/4 |
| 2017/0171189 | A1 * | 6/2017 | Byszio | H04L 63/0815 |

OTHER PUBLICATIONS

Out-of-Band Authentication Model with Hashcash Brute-Force Prevention, Violaris et al, Aug. 2014 (Year: 2014).*

* cited by examiner

*Primary Examiner* — Jahangir Kabir
(74) *Attorney, Agent, or Firm* — Farjami & Farjami LLP (57) ABSTRACT

A system for granting access to an account at an access device includes a computer server having a hardware processor and a memory storing a software code. The hardware processor executes the software code to receive a login request from the access device through a first communications socket, open a second communications socket between the access device and the computer server, transmit a verification request message including a required call-to-action to a verification device through a third communications socket, and receive a verification response message verifying that the required call-to-action has been completed at the verification device. Upon receiving the verification response message, the software code sends an access token for accessing the account to the access device through the second communications socket, receives the access token from the access device, and grants the access device access to the account.

16 Claims, 9 Drawing Sheets

Hello user,

We received a request to log you in to your XYZ account on the following device:

Streaming Media Player A

Did you submit the request?

580 — Yes, authorize this device

[ Validation Code ]
582

No, this wasn't me

EXPEDITED USER AUTHENTICATION

BACKGROUND

The use of multiple computing platforms to access content provided by the same service is increasingly common. For example, a person subscribing to a streaming media service, such as Netflix® or Hulu® for example, may at various times use a smartphone, tablet computer, laptop computer, smart television, and a dedicated streaming media player to consume content of their choice. Although such cross platform accessibility to content confers many benefits, even basic measures taken by streaming services to ensure user account security can make use of multiple platforms frustrating.

For instance, users often forget their passwords, which may make it difficult and time consuming to access their account from a device that they are not already logged into their account on. Also, there may be use cases in which an account holding user wishes to log in to their account from the home of a friend so that they can consume content associated with the account together or with a group. In some of those cases the account holding user may prefer not to have to disclose his/her password or other authentication credentials in the group setting in order to login.

SUMMARY

There are provided systems and methods for expediting user authentication, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for expediting user authentication that overcome the drawbacks and deficiencies in the conventional art. It is noted that, in some implementations, the present user authentication solution may be performed as a substantially automated process by a substantially automated system. It is noted that, as used in the present application, the terms "automation," "automated", and "automating" refer to systems and processes that do not require the participation of a human user, such as a system administrator. Although, in some implementations, a human system operator or administrator may review the performance of the automated systems described herein, that human involvement is optional. Thus, the methods described in the present application may be performed under the control of hardware processing components of the disclosed automated systems.

Figure 1A:
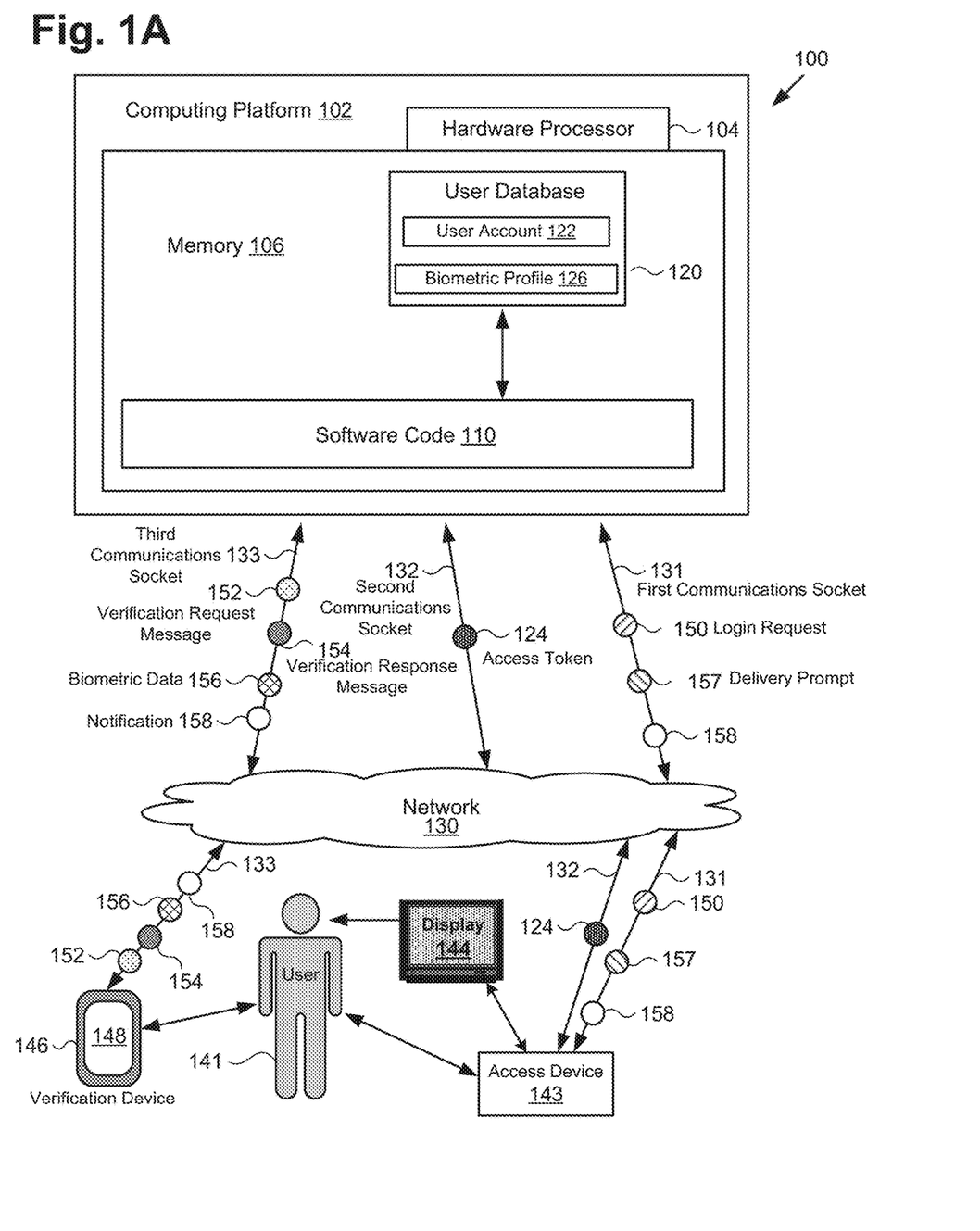
FIG. 1A shows a diagram of an exemplary system for expediting user authentication, according to one implementation.

FIG. 1A shows a diagram of an exemplary system for expediting user authentication, according to one implementation. As discussed below, system 100 may be implemented using a computer server accessible over a local area network (LAN) or may be implemented as cloud-based system. As shown in FIG. 1A, system 100 includes computing platform 102 having hardware processor 104, and system memory 106 implemented as a non-transitory storage device. According to the present exemplary implementation, system memory 106 stores user database 120 including user account 122 and biometric profile 126 of user 140, as well as software code 110 for expediting authentication of user 141.

As also shown in FIG. 1A, system 100 is implemented within a use environment including communication network 130 providing first communications socket 131, second communications socket 132, and third communications socket 133, as well as access device 143 of user 141 coupled to display 144, verification device 146 of user 141 including display 148, and user 141 interacting with system 100. Also shown in FIG. 1A are login request 150, verification request message 152, verification response message 154, access token 124, biometric data 156, delivery prompt 157, and notification 158.

It is noted that although the present application refers to software code 110 and user database 120 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1A depicts software code 110 and user database 120 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. Thus, it is to be understood that user database 120, as well as various features of software code 110 may be stored and/or executed using the distributed memory and/or processor resources of system 100.

In one such implementation, computing platform 102 of system 100 may correspond to one or more web-based computer servers, accessible over a packet-switched network such as the Internet, for example. In that implementation, first, second, and third communications sockets 131, 132, and 133 may take the form of WebSocket protocol communication channels, for example. However, in other implementations, computing platform 102 may correspond to one or more computer servers supporting a wide area network (WAN), a LAN, or included in another type of limited distribution or private network. Accordingly, computing platform 102 will hereinafter be referred to as "computer server 102."

According to the implementation shown by FIG. 1A, user 141 may utilize verification device 146 to interact with system 100 over communication network 130 to expedite login of access device 143 to a web-based service account held by user 141, i.e., user account 122. In one implementation, access device 143 may be an entertainment device, such as a game console, streaming device, or other digital media player, that user 141 wishes to log in to in order to access content, and verification device 146 may be a smartphone, tablet computer, laptop computer, desktop computer, or other primary device of the user 141 for accessing emails, text messages, and other types of accounts and various forms of communication.

That is to say, verification device 146 may be any suitable system that implements data processing capabilities sufficient to provide a user interface, support connections to communication network 130, and implement the functionality ascribed to verification device 146 herein. In other implementations, verification device 146 may take the form of a desktop computer, a laptop computer, a game console, a smart television (smart TV), a streaming media player, or a wearable communication device such as a smartwatch or augmented reality (AR) or virtual reality (VR) headset or glasses, to name a few examples.

With respect to display 144 coupled to access device 143, display 144 may be communicatively coupled to but physically separate from access device 143, as shown in FIG. 1A, or may be physically integrated with access device 143. For example, where access device 143 is implemented as a smart TV, display 144 will typically be integrated with access device 143. By contrast, where access device 143 is implemented as a streaming media player, display 144 may take the form of a monitor separate from access device 143. Analogously, display 148 may be physically integrated with verification device 146, as shown in FIG. 1A, or may be communicatively coupled to but physically separate from verification device 146. For example, where verification device 146 is implemented as a smartphone, laptop computer, or tablet computer, display 148 will typically be integrated with verification device 146. By contrast, where verification device 146 is implemented as a desktop computer, display 148 may take the form of a monitor separate from verification device 146 in the form of a computer tower. Displays 144 and 148 may be implemented as liquid crystal displays (LCDs), light-emitting diode (LED) displays, organic light-emitting diode (OLED) displays, or any other suitable display screens that performs a physical transformation of signals to light.

According to the exemplary implementation shown in FIG. 1A, user 141 is the account holder of user account 122. In addition, user 141 is the owner of access device 143 and verification device 146. Thus, the use case depicted by FIG. 1A is one in which user 141 utilizes his/her own verification device 146 to expedite login to his/her own user account 122 using access device 143 of user 141. As a specific example, where access device 143 is a streaming media player and display 144 is a TV coupled to streaming media player 143, user 141 may utilize verification device 146 in the form of a smartphone, for example, to expedite login to user account 122 by access device 143 in order to consume movie, TV, or game content associated with user account 122 using access device 143 and display 144.

Figure 1B:
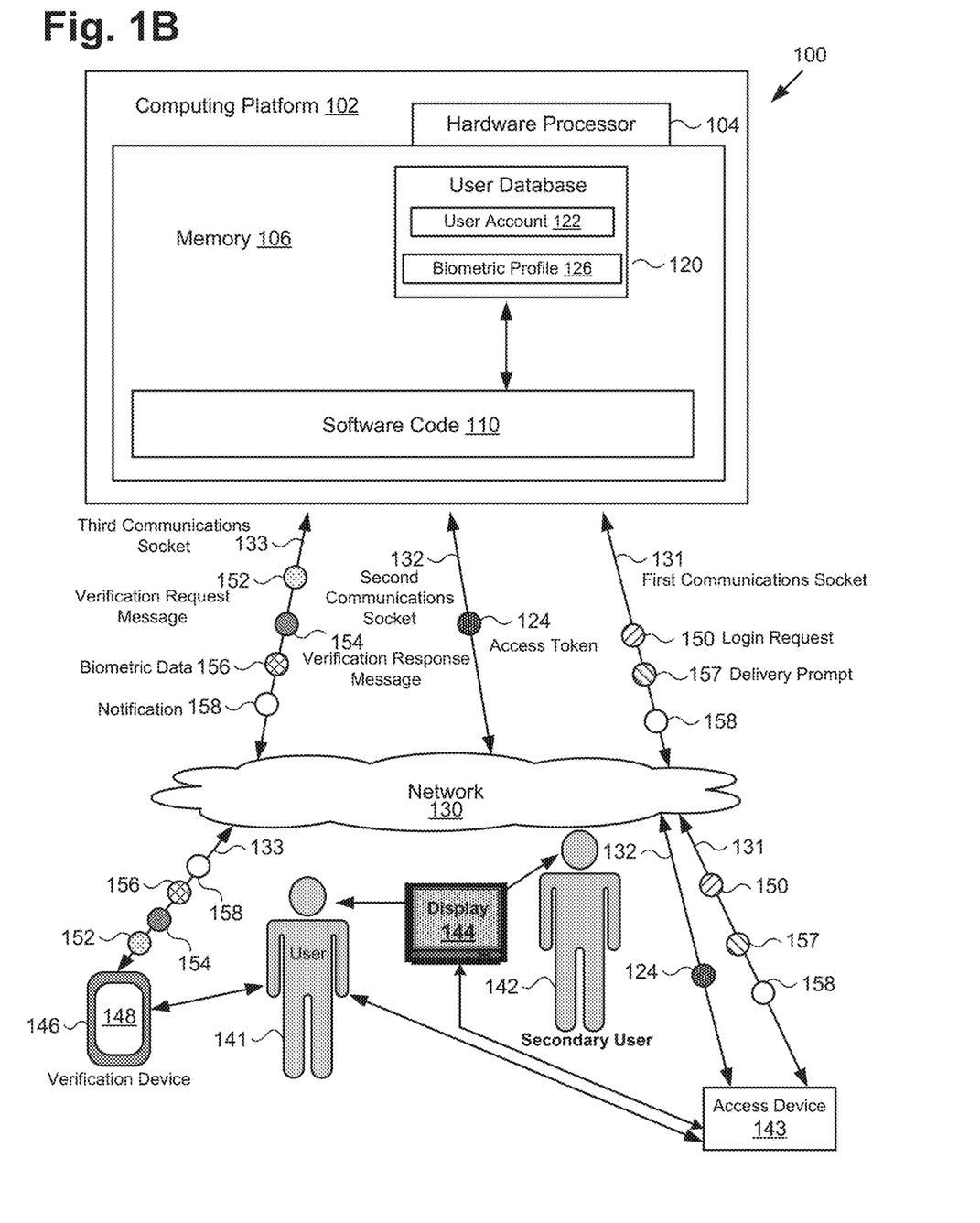
FIG. 1B shows a diagram of a system for expediting user authentication, according to another exemplary implementation.

By way of contrast, and referring to FIG. 1B, FIG. 1B shows a diagram of system 100 for expediting user authentication, according to another exemplary use case. According to the exemplary use case shown in FIG. 1B, user 141 is the account holder of user account 122. In addition, user 141 is the owner of verification device 146. However, in the present use case, user 141 is a guest of secondary user 142, who owns access device 143 and display 144, and acts as a host to user 141. Thus, the use case depicted by FIG. 1B is one in which user 141 utilizes his/her own verification device 146 to expedite login to his/her user account 122 by access device 143 belonging to secondary user 142. As a specific example, where access device 143 is a streaming media player and display 144 is a TV coupled to streaming media player 143, user 141 may utilize verification device 146 in the form of a smartphone, for example, to expedite login to his/her user account 122 by access device 143 belonging to secondary user 142, in order to consume movie, TV, or game content to which user 141 has an entitlement, together with secondary user 142, using access device 143 and display 144 of secondary user 142.

Figure 1C:
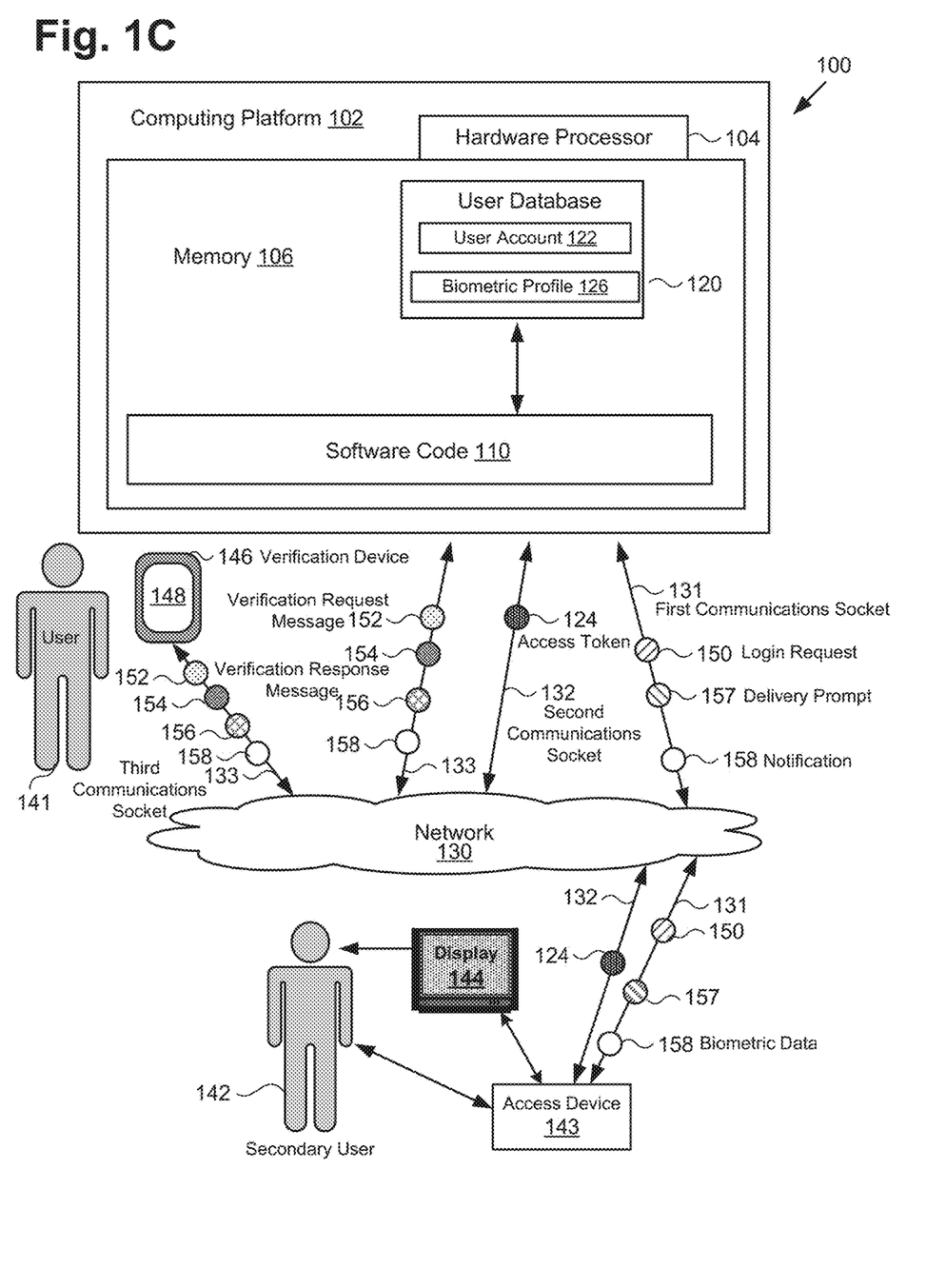
FIG. 1C shows a diagram of a system for expediting user authentication, according to yet another exemplary implementation.

By way of further contrast, and referring to FIG. 1C, FIG. 1C shows a diagram of system 100 for expediting user authentication, according to yet another exemplary use case. According to the exemplary use case shown in FIG. 1C, user 141 is the account holder of user account 122. In addition, user 141 is the owner of verification device 146. However, in the present use case, user 141 is physically remote from secondary user 142, who owns access device 143 and display 144. Thus, the use case depicted by FIG. 1C is one in which user 141 utilizes his/her own verification device 146 to expedite login to his/her own user account 122 by access device 143 belonging to secondary user 142, in order to enable secondary user 142 to access content to which user 141 holds an entitlement. As a specific example, where access device 143 is a streaming media player and display 144 is a TV coupled to streaming media player 143, user 141 may utilize verification device 146 in the form of a smartphone, for example, to expedite login to his/her user account 122 by access device 143 belonging to secondary user 142, in order to enable secondary user 142 to consume movie, TV, or game content to which user 141 has an entitlement, without user 141 being in the company of secondary user 142.

Figure 2:
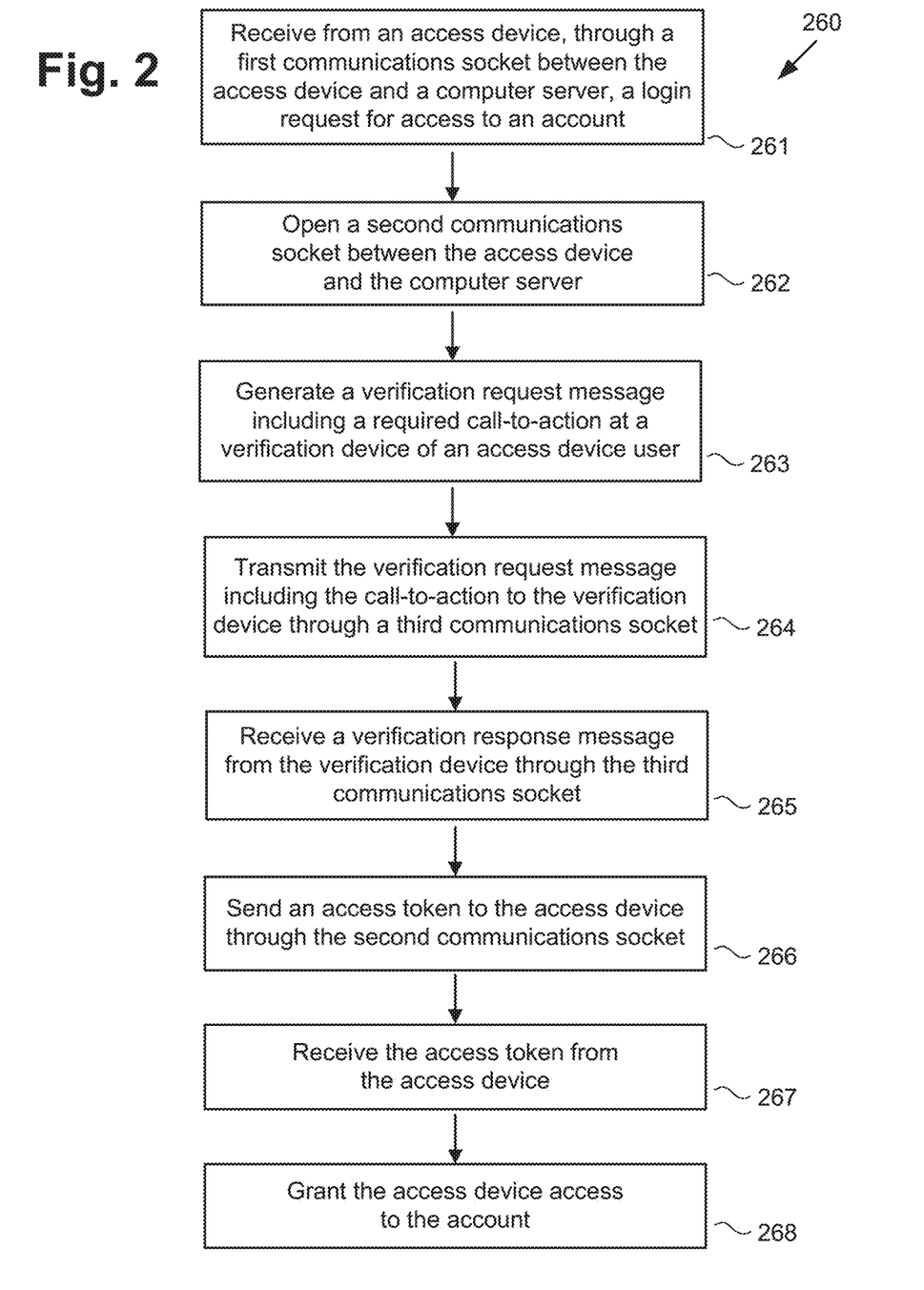
FIG. 2 is a flowchart presenting an exemplary method for use by a system for expediting user authentication to grant access to an account at an access device, according to one implementation.

The functionality of system 100 will be further described by reference to FIG. 2 in combination with the specific exemplary implementation shown in FIG. 1A. FIG. 2 shows flowchart 260 presenting an exemplary method for use by a system for expediting user authentication to grant access to an account at an access device, according to one implementation. With respect to the method outlined in FIG. 2, it is noted that certain details and features have been left out of flowchart 260 in order not to obscure the discussion of the inventive features in the present application.

Referring to FIG. 2 in combination with the exemplary implementation shown by FIG. 1A, flowchart 260 begins with receiving, through first communications socket 131 between access device 143 and computer server 102, login request 150 from access device 143 (action 261). Login request 150 includes information identifying access device 143 and information identifying user 141 of access device 143, the information identifying user 141 being linked to user account 122 of user 141.

User 141 may utilize access device 143 to launch a web browser on display 144 and attempt to log in to user account 122 held by user 141, such as a streaming media service account, for example. In the particular use case depicted by FIG. 1A, user 141 may have previously setup an account with system 100, but may have used a communication device or system other than access device 143 for previous logins, such as verification device 146 for example. An account password typically required for login to user account 122 may not be remembered by user 141, thereby creating an obstacle to login and resulting in user 141 sending login request 150 to system 100, soliciting assistance in completing the login process.

Login request 150 may be received by software code 110, executed by hardware processor 104, via communication network 130 and first communications socket 131. In some implementations, login request 150 may include a failed login attempt. As noted above, login request 150 includes at least information identifying user 141, and information identifying access device 143 from which login request 150 originates, such as a device identifier of access device 143, as known in the art. In some implementations, login request 150 may also include the geographical region in which access device 143 is located, as well as information linking login request 150 to user account 122. For example, login request 150 may include a username of user 141, an email address of user 141, a mobile phone number of user 141, or biometric data 156 of user 141, such as a facial scan, retinal scan, fingerprint, voice sample, or the like. In one implementation, the information linking login request 150 to user account 122 may be entered into a graphical user interface (GUI) provided by access device 143. For example, user 141 may use an input device, such as a keyboard, game controller, remote control, and/or voice remote to enter a username or email associated with his/her account, and characters for the user's username or email may be populated/displayed into a display field of a login screen of the GUI.

The information identifying user 141 that is included in login request 150 may also identify verification device 146. For example, login request 150 may include a unique address associated with verification device 146, such as a phone number, or a secondary account (e.g., email or social media account) that verification device 146 is logged into. Moreover, in some implementations, login request 150 may include a data structure, such as a JSON object enabling display of a message to user 141, or for use in updating a decision tree flow or providing any other necessary business logic for authenticating access device 143 and expediting login by user 141.

Figure 3:
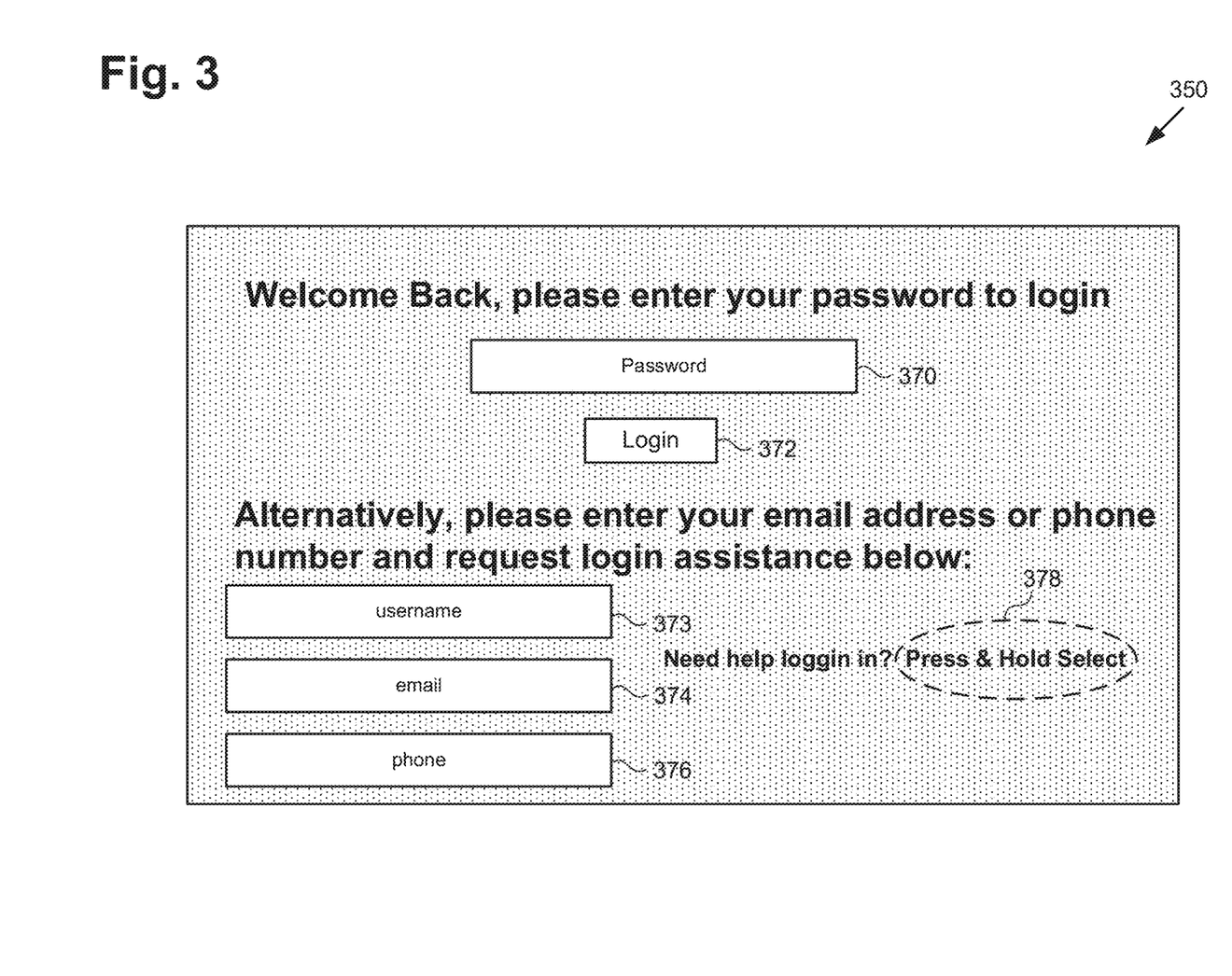
FIG. 3 shows an exemplary login request received from an access device, according to one implementation.

FIG. 3 shows exemplary login request 350 received from access device 143, according to one implementation. Login request 350 corresponds in general to login request 150, in FIGS. 1A, 1B, and 1C. Thus, login request 150 may share any of the characteristics attributed to corresponding login request 350 by the present disclosure, and vice versa. As shown in FIG. 3, login request 350 includes an opportunity for a user to login by entering a password in password field 370 and selecting login button 372. Alternatively, the user may provide other user information, such as by populating username field 373, email field 374, or phone number field 376, for example, and follow instruction 378. For example, in one implementation, user 141 may not remember his/her password or may be having trouble using his/her login credentials, and access device 143 may prompt user 141 to provide the other user information as part of an alternative login process.

Flowchart 260 continues with, in response to receiving login request 150, opening second communications socket 132 between access device 143 and computer server 104 (action 262). As noted above, in some implementations, second communications socket 132 may be a WebSocket protocol communication channel. Opening of second communications socket 132 between access device 143 and computer server 102 may be performed by software code 110, executed by hardware processor 104.

Flowchart 260 continues with, upon opening second communications socket 132, generating verification request message 152 including a call-to-action at verification device 146 of user 141, as well as a validation code (action 263). It is noted that the validation code included in verification request message 152 may be embedded in verification request message and may not be visible to user 141. Referring to the exemplary implementation shown by FIG. 1A, hardware processor 104 of system 100 may execute software code 110 to generate verification request message 152.

Flowchart 260 continues with transmitting verification request message 152 including the call-to-action and the validation code to verification device 146 through third communications socket 133 (action 264). As shown in FIG. 1A, hardware processor 104 of system 100 may execute software code 110 to transmit verification request message 152 to verification device 146 of user 141, via communication network 130 and third communications socket 133.

In some implementations, it may be advantageous or desirable to notify user 141 that verification request message 152 has been transmitted to verification device 146. In those implementations, the present method may include transmitting delivery prompt 157 to access device 143, wherein delivery prompt 157 informs user 141 that verification request message 152 has been transmitted to verification device 146.

Figure 4:
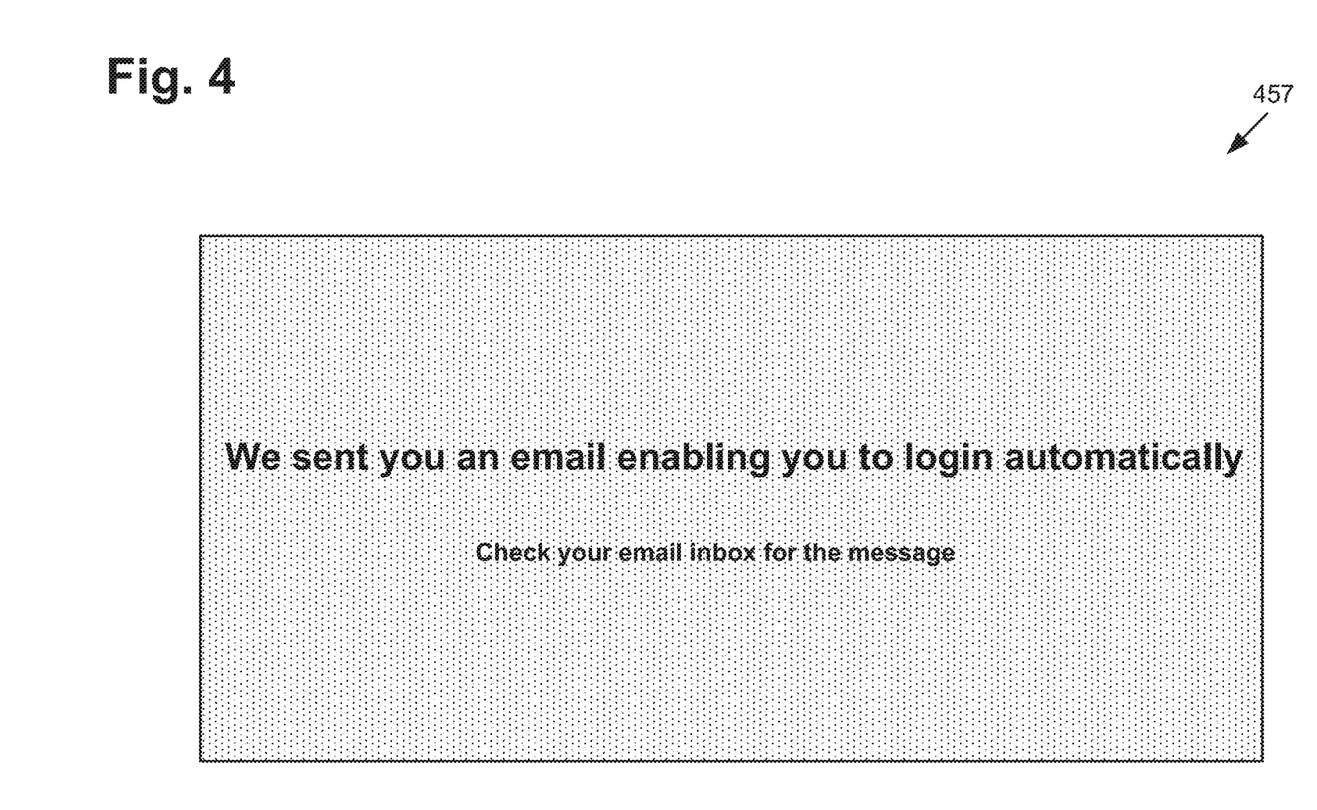
FIG. 4 shows an exemplary delivery prompt transmitted to an access device, according to one implementation.

FIG. 4 shows exemplary delivery prompt 457. Delivery prompt 457 corresponds in general to delivery prompt 157, in FIGS. 1A, 1B, and 1C, and those corresponding features may share any of the characteristics attributed to either feature by the present disclosure. It is noted that although delivery prompt 457 identifies verification request message 152 as an email message, that representation is merely exemplary. As noted above, in other implementations, verification request message 152, as well as delivery prompt 157/457, may be a Short Message Service (SMS) text message. In implementations of the present method that include transmittal of delivery prompt 157/457, delivery prompt 157/457 may be transmitted to access device 143 by software code 110, executed by hardware processor 104.

Figure 5:
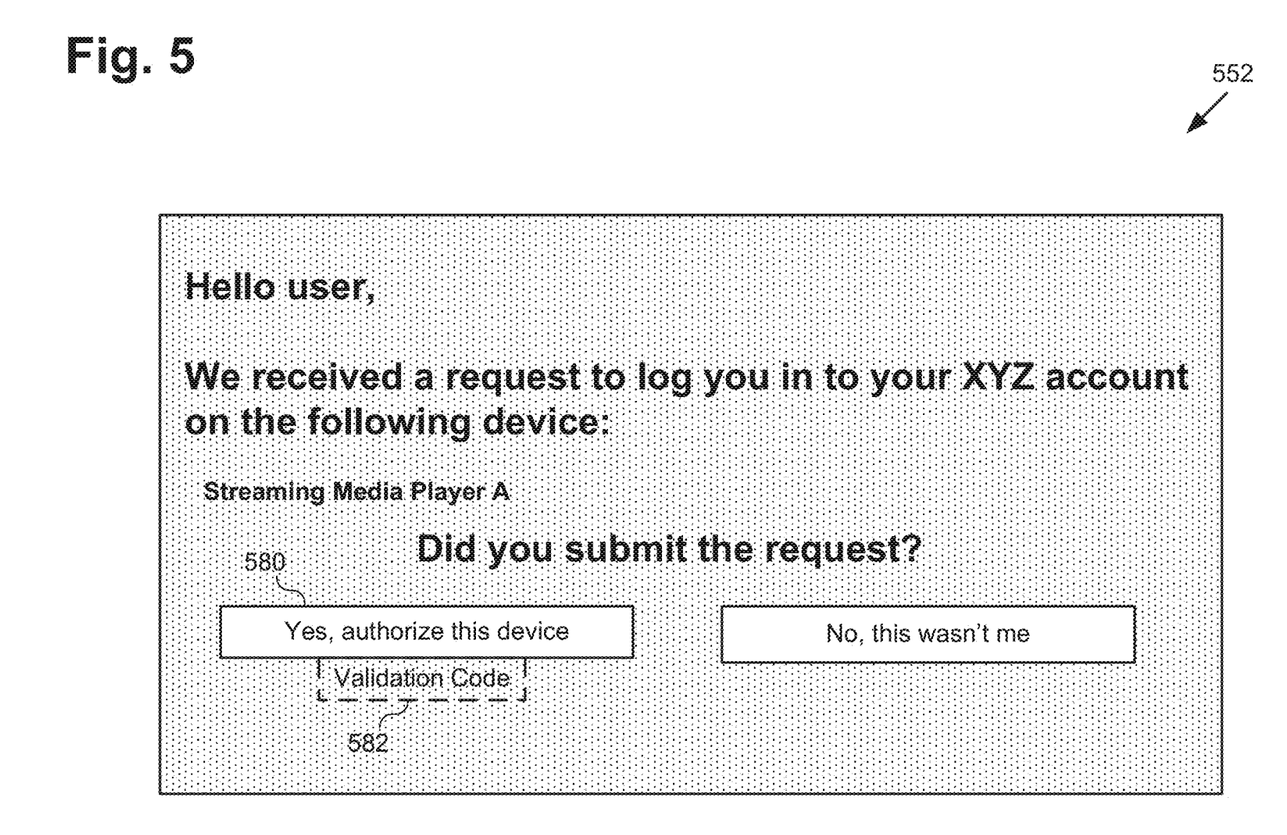
FIG. 5 shows an exemplary verification request message transmitted by a system for expediting user authentication, according to one implementation.

FIG. 5 shows exemplary verification request message 552 according to one implementation. Verification request message 552 corresponds in general to verification request message 152, in FIGS. 1A, 1B, and 1C. Thus, verification request message 152 may share any of the characteristics attributed to corresponding verification request message 552 by the present disclosure, and vice versa. As shown in FIG. 5, verification request message 552 includes validation code 582 and informs user 141 that login request 150/350 was received, identifies access device 143, i.e., Streaming Media Player A, from which login request 150/350 was received, and requests that user 141 authorize login by access device 143.

Verification request message 552 may take a variety of forms. For example, in some implementations, verification request message 552 may be transmitted to user 141 as an email message. However, in other implementations, verification request message 552 may be transmitted as an SMS text message including validation code 582 as an embedded link, for example. In either implementation, verification request message 552 may enable user 141 to authorize login of access device 143 through performance of a call-to-action at verification device 146. For example, as shown in FIG. 5, such a call-to-action may be executable by a single click authorization on verification request message 552 at clickback authorization field 580.

Flowchart 260 continues with receiving, through third communications socket 133, from verification device 146 and in response to the required call-to-action, verification response message 154 including verification that the required call-to-action has been completed at verification device 146 of user 141 (action 265). In some implementations, verification response message 154 may correspond to verification request message 152/552 after use of verification device 146 to perform single click selection of authorization field 580 by user 141. That is to say, verification response message 154 may return validation code 582 included in verification request message 152/552 to system 100 for redemption in response to user 141 performing single click selection of authorization field 580.

However, in other implementations, the required call-to-action included in verification request message 152/552 may be input of biometric data 156 of user 141, such as a facial scan, retinal scan, fingerprint, or voice sample of user 141, for example. In those latter implementations, verification response message 154 may include biometric data 156 as well as validation code 582 included in verification request message 152/552. In some of those implementations, biometric data 156 may be compared with biometric profile 126 of user 141 in order to expedite authentication of user 141. Verification response message 154 may be received by software code 110, executed by hardware processor 104, via communications network 130 and third communications socket 133.

It is noted that, in some implementations, validation code 582 included in verification request message 152/552 and returned to system 100 in verification response message 153 may be redeemable during a redemption time window beginning when verification request message 152/552 is transmitted to verification device 146 in action 264, such as a fifteen minute redemption time window merely as an example. In some of those implementations, hardware processor 104 may further execute software code 110 to send access token 124 through second communications socket 132 to access device 143 if validation code 582 is received from verification device 146 during the redemption time window, and terminate second communications socket 132 without sending access token 124 if validation code 582 is not received from verification device 146 during the redemption time window.

Flowchart 260 continues with, upon receiving verification response message 154 including validation code 582, sending access token 124 for accessing user account 122 to access device 143 through second communications socket 132 (action 266). Access token 124 may be sent to access device 143 through second communications socket 132 by software code 110, executed by hardware processor 104. Subsequent to action 266, hardware processor 104 of system 100 may execute software code 110 to receive access token 124 from access device 143 (action 267), and upon receiving access token 124 from access device 143, may grant access device 143 access to user account 122 (action 268).

It is noted that, in some implementations, hardware processor 104 may execute software code 110 to determine that user account 122 is in good standing before transmitting verification request message 152/552 in action 264. In those implementations, if user account 122 is determined not to be in good standing, the required call-to-action included in verification request message 152/552 may include the requirement that user 141 perform a password change for user account 122, using verification device 146. For example, in those implementations, hardware processor 104 of system 100 may execute software code 110 to send a request for a password change to verification device 146 through third communications socket 133, receive a new password through third communications socket 133, update user account 122 to associate the new password with user account, and send access token 124 to access device 143 through second communications socket 132 after user account 122 has been updated with the new password.

It is further noted that, in some implementations, access token 124 may be a one-time use access token, or may be redeemable during a redemption time window beginning when access token 124 is sent to access device 143 in action 266, such as a fifteen minute redemption time window merely as an example. In some of those implementations, hardware processor 104 may further execute software code 110 to grant access device 143 access to user account 122 if access token 124 is received from access device 143 during the redemption time window, but to deny access device 143 access to user account 122 if access token 124 is received from access device 143 after expiration of the redemption time window.

Moreover, in some implementations, access token 124 may be for event specific or content specific use. For example, verification request message 152/552 sent to user 141 in the use case shown in FIG. 1C may read "Streaming Media Player A of secondary user 142 wants to access content Z" and user 141 can choose to authorize access to content Z but not to other content associated with user account 122. Alternatively, in another use case, secondary user 142 may type in a promotion code (promo code) associated with the user account 122 of user 141, and user 141 can be notified by verification request message 152/552 that the promo code is being used before authorizing.

Figure 6:
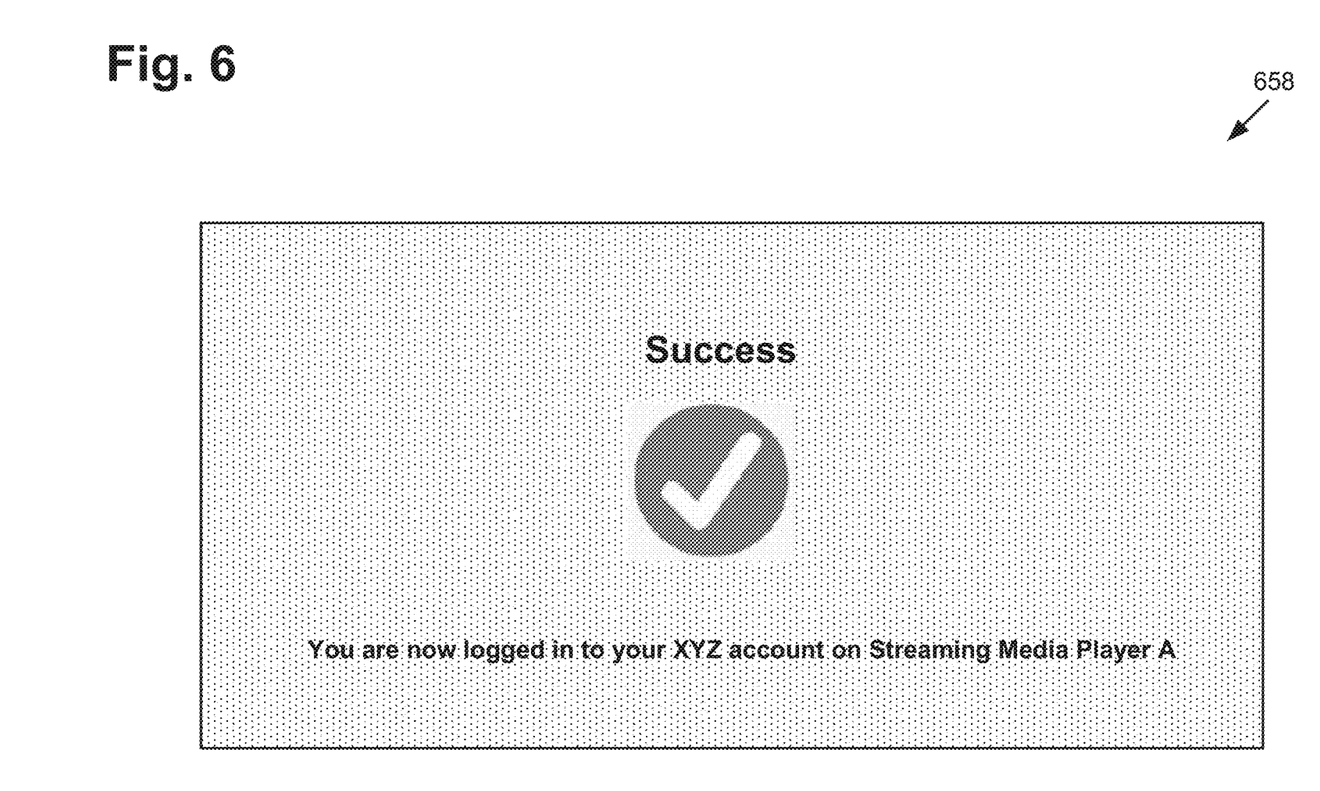
FIG. 6 shows an exemplary message informing an access device of a successful login.

Although not included in the outline provided by flowchart 260, in some implementations the present method may also include informing verification device 146 or access device 143 of a successful login in by access device 143. In those implementations, hardware processor 104 may execute software code 110 to transmit notification 158 to access device 143 and/or to verification device 146, stating that access device 143 has been successfully logged in to user account 122. Exemplary notification 658 corresponding in general to notification 158 is shown in FIG. 6.

It is noted that, in some implementations, hardware processor 104 may execute software code 110, to perform actions 261, 262, 263, 264, 265, 266, 267, and 268 in an automated process from which human involvement may be omitted. It is further noted that, in some implementations, hardware processor 104 may further execute software code 110 to stream media content associated with user account 122, such as movie, TV, or game content, for example, to access device 143 through first communications socket 131.

The systems and methods for expediting user authentication disclosed in the present application provide substantial advantages over conventional login schemes. For example, the present authentication solutions allow a user to sign into multiple devices more easily. Also, the present authentication solutions advantageously allow an account holding user to utilize a device of another user to access their own account, and to do so in a more secure fashion than through use of a password. For instance, passwords can be insecure in that they may be sniffed out and re-used in a replay attack, or may be viewed by the others when entered by a user in a non-private environment. Additionally, the present user authentication solutions allow a user to use one device to sign into another device in a manner that is cross-platform and that does not require the user to pair or otherwise synchronize the devices together. By contrast, conventional attempts to implement password-free authentication have required that the devices utilize the same operating system or that they be connected over the same network (e.g., being on the same WiFi network or pairing devices using Bluetooth).

In another conventional approach to user authentication, a code is displayed on screen and the user is asked to visit a website on a separate device and enter the code. When the user has entered the code on the separate device, they are asked to log in to their account using their username and password. The disadvantages of this conventional approach are at least twofold. First, if the two devices are somewhat distant from one another, for example located in different rooms of a residence, the user has to either remember the code or walk back and forth between the rooms to utilize it. Second, the user is still required to perform a traditional username and password login at the separate device. By contrast, the expedited user authentication solution disclosed in the present application advantageously enables user account access without requiring the user to remember any codes or passwords. Thus, the present novel and inventive concepts improve over the conventional state-of-the-art by effectively combining account verification with login assistance to advantageously expedite the process of user authentication.

Figure 7:
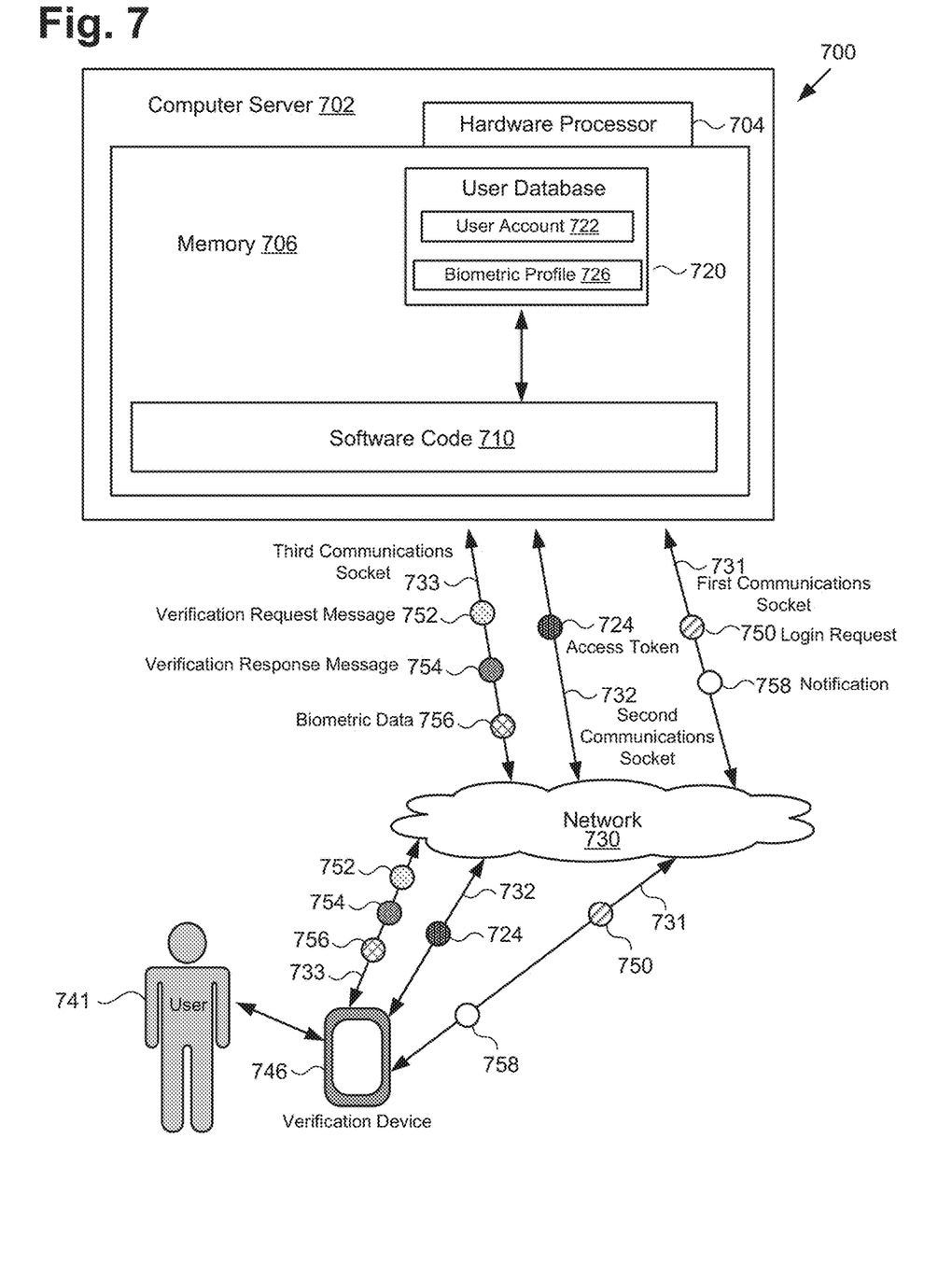
FIG. 7 shows a diagram of a system for expediting user authentication, according to another exemplary implementation.

FIG. 7 shows a diagram of an exemplary system for expediting user authentication, according to another implementation. As shown in FIG. 7, system 700 includes computing platform 702 (hereinafter "computer server 702") having hardware processor 704, and system memory 706 implemented as a non-transitory storage device. According to the present exemplary implementation, system memory 706 stores user database 720 including user account 722 and biometric profile 726 of user 741, as well as software code 710 for expediting authentication of user 741.

As also shown in FIG. 7, system 700 is implemented within a use environment including communication network 730 providing first communications socket 731, second communications socket 732, and third communications socket 733, as well as user device 746, and user 741 interacting with system 700 through use of user device 746. Also shown in FIG. 7 are login request 750, verification request message 752, verification response message 754, access token 724, biometric data 756, and notification 758.

System 700 including computer server 702 having hardware processor 704 and system memory 706 storing software code 710 and user database 720 corresponds in general to system 100 including computer server 102 having hardware processor 104 and system memory 106 storing software code 110 and user database 120, in FIGS. 1A, 1B, and 1C. Consequently, system 700, computer server 702, hardware processor 704, system memory 706, software code 710, and user database 720 may share any of the characteristics attributed to respective system 100, computer server 102, hardware processor 104, system memory 106, software code 110, and user database 120, above.

In addition, communication network 730 providing first communications socket 731, second communications socket 732, and third communications socket 733, in FIG. 7, corresponds in general to communication network 130 providing first communications socket 131, second communications socket 132, and third communications socket 133, in FIGS. 1A, 1B, and 1C. As a result, communication network 730, first communications socket 731, second communications socket 732, and third communications socket 733 may share any of the characteristics attributed to respective communication network 130, first communications socket 131, second communications socket 132, and third communications socket 133, above. Moreover, login request 750, verification request message 752, verification response message 754, access token 724, biometric data 756, and notification 758 correspond respectively in general to login request 150, verification request message 152, verification response message 154, access token 124, biometric data 156, and notification 158, and share any of the characteristics attributed to those corresponding features, above.

The implementation shown in FIG. 7 differs from those shown in FIGS. 1A, 1B, and 1C in that user 741 uses single user device 746 as both an access device and a verification device. User device 746 may be any suitable system that implements data processing capabilities sufficient to provide a user interface, support connections to communication network 730, and implement the functionality ascribed to user device 746 herein. In various implementations, user device 746 may take the form of a desktop computer, a laptop computer, a game console, a smart TV, a streaming media player, or a wearable communication device such as a smartwatch or AR or VR headset or glasses, to name a few examples.

User 741 may utilize user device 746 to attempt to log in to user account 722 on computer server 702, but may have trouble doing so because user 741 has forgotten his/her password, for example. User 741 may utilize user device 746 to send login request 750 to computer server 702 through first communications socket 731 between user device 746 and computer server 702, where login request 750 includes information identifying user device 746 and information identifying user 741 of user device 746, who is the user linked to user account 722. In response to receiving login request 750 from user device 746 through first communications socket 731, computer server 702 opens second communications socket 732 between user device 746 and computer server 702, and upon opening second communications socket 732, generates verification request message 752 including a required call-to-action at user device 746, as well as a validation code.

Computer server 702 then transmits, through third communications socket 733, verification request message 752 including the required call-to-action and validation code to user device 746, and receives, through third communications socket 733, from user device 746 and in response to the required call-to-action, verification response message 754 including verification that the required call-to-action has been completed at user device 746. For example, verification response message 754 may return the validation code included in verification request message 752 to system 700 for redemption. In some implementations, the required call-to-action may include user 741 utilizing user device 746 to submit biometric data 756 of user 741 to computer server 702, as discussed above by reference to action 265 in FIG. 2.

Upon receiving verification response message 754 including the validation code, computer server 702 sends access token 724 for accessing user account 722 to user device 746 through second communications socket 732, and then receives access token 724 from user device 746. Upon receiving access token 724 from user device 746, computer server 702 may grant user device 746 access to user account 722.

As discussed above by reference to FIG. 1A, in some implementations, computer server 702 may determine that user account 722 is in good standing before transmitting verification request message 752. In those implementations, if user account 722 is determined not to be in good standing, the required call-to-action included in verification request message 752 may include the requirement that user 741 perform a password change for user account 722, using user device 746.

As further discussed above, in some implementations, the validation code included in verification request message 752 and returned to system 700 in verification response message 753 may be redeemable during a redemption time window beginning when verification request message 752 is transmitted to user device 746, such as a fifteen minute redemption time window merely as an example. In some of those implementations, hardware processor 704 may further execute software code 710 to send access token 724 through second communications socket 732 to user device 746 if the validation code is received from user device 746 during the redemption time window, and terminate second communications socket 732 without sending access token 724 if the validation code is not received from user device 746 during the redemption time window.

As also discussed above, access token 724 may be a one-time use access token, or may be redeemable during a redemption time window beginning when access token 724 is sent to user device 746, such as a fifteen minute redemption time window for example. In some of those implementations, computer server 702 may grant user device 746 access to user account 722 if access token 724 is received from user device 746 during the redemption time window, but may deny user device 746 access to user account 722 if access token 724 is received from user device 746 after expiration of the redemption time window.

Thus, the present application discloses systems and methods for expediting user authentication that overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for granting access to an account at an access device, the system comprising:
    a computer server including a hardware processor and a memory;
    a software code stored in the memory;
    the hardware processor configured to execute the software code to:
        receive, through a first communications socket between the access device and the computer server, a login request from the access device, the login request including information identifying the access device and information identifying a user of the access device, the information identifying the user being linked to the account;
        in response to receiving the login request, determine whether the account is in good standing;
        in response to determining that the account is not in good standing, opening a second communications socket between the access device and the computer server;
        upon opening the second communications socket, generate a verification request message comprising a validation code and a required call-to-action at a verification device of the user of the access device;
        transmit, through a third communications socket, the verification request message comprising the validation code and the required call-to-action to the verification device, wherein the validation code transmitted to the verification device is embedded in the verification request message and not visible to the user;
        receive, through the third communications socket through which the verification request message was transmitted, directly from the verification device and in response to the required call-to-action, a verification response message comprising the validation code that was embedded in the verification request message as part of a verification that the required call-to-action has been completed at the verification device of the user;
        upon receiving the verification response message, send an access token for accessing the account to the access device through the second communications socket;
        receive the access token from the access device; and
        upon receiving the access token from the access device, grant the access device access to the account.

2. The system of claim 1, wherein the hardware processor is configured to further execute the software code to stream media content associated with the account to the access device through the first communications socket.

3. The system of claim 1, wherein the validation code is redeemable during a redemption time window beginning when the verification request message is transmitted to the verification device.

4. The system of claim 1, wherein when the account is not in good standing, the required call-to-action includes a request for a password change, and wherein the hardware processor is configured to further execute the software code to:

receive, after transmitting the verification request message to the verification device, a new password through the third communications socket;

update the account to associate the new password with the account; and send the access token to the access device through the second communications socket after the account has been updated with the new password.

5. The system of claim 1, wherein the verification request message is transmitted as one of an email message or a Short Message Service (SMS) message, and wherein the required call-to-action is executable by a single click on the verification request message.

6. The system of claim 1, wherein the hardware processor is configured to further execute the software code to transmit a delivery prompt to the access device, wherein the delivery prompt informs the user that the verification request message has been transmitted to the verification device.

7. The system of claim 1, wherein the access device is one of a streaming media player, a game console, or a smart TV, and wherein the verification device is one of a laptop computer, a tablet computer, a desktop computer, a smartphone, or a wearable communication device.

8. The system of claim 1, wherein the required call-to-action is one of input of a biometric data of the user or a voice input by the user.

9. A method for use by a system to grant access to an account at an access device, the system including a computer server having a hardware processor and a memory storing a software code, the method comprising:

receiving, by the software code executed by the hardware processor and through a first communications socket between the access device and the computer server, a login request from the access device, the login request including information identifying the access device and information identifying a user of the access device, the information identifying the user being linked to the account;

determining, by the software code executed by the hardware processor and in response to receiving the login request, whether the account is in good standing;

opening, by the software code executed by the hardware processor and in response to determining that the account is not in good standing, a second communications socket between the access device and the computer server;

generating, by the software code executed by the hardware processor upon opening the second communications socket, a verification request message comprising a validation code and a required call-to-action at a verification device of the user of the access device;

transmitting, by the software code executed by the hardware processor, the verification request message comprising the validation code and the verification device through a third communications socket, wherein the validation code transmitted to the verification device is embedded in the verification request message and not visible to the user;

receiving, by the software code executed by the hardware processor and through the third communications socket through which the verification request message was transmitted, a verification response message directly from the verification device in response to the required call-to-action, the verification response message comprising the validation code that was embedded in the verification request message as part of a verification that the required call-to-action has been completed at the verification device of the user;

sending through the second communications socket, by the software code executed by the hardware processor, upon receiving the verification response message, an access token for accessing the account to the access device;

receiving, by the software code executed by the hardware processor, the access token from the access device; and granting the access device access to the account, by the software code executed by the hardware processor, upon receiving the access token from the access device.

10. The method of claim 9, further comprising streaming, by the software code executed by the hardware processor, media content associated with the account to the access device through the first communications socket.

11. The method of claim 9, wherein the validation code is redeemable during a redemption time window beginning when the verification request message is transmitted to the verification device.

12. The method of claim 9, wherein, when the account is not in good standing the required call-to-action includes a request for a password change, and wherein the method further comprises:

receiving, by the software code executed by the hardware processor, after transmitting the verification request message to the verification device, a new password through the third communications socket;

updating the account, by the software code executed by the hardware processor, to associate the new password with the account; and sending, by the software code executed by the hardware processor, the access token to the access device through the second communications socket after the account has been updated with the new password.

13. The method of claim 9, wherein the verification request message is transmitted as one of an email message or a Short Message Service (SMS) message, and wherein the required call-to-action is executable by a single click on the verification request message.

14. The method of claim 9, further comprising transmitting, by the software code executed by the hardware processor, a delivery prompt to the access device, wherein the delivery prompt informs the user that the verification request message has been transmitted to the verification device.

15. The method of claim 9, wherein the access device is one of a streaming media player, a game console, or a smart TV, and wherein the verification device is one of a laptop computer, a tablet computer, a desktop computer, a smartphone, or a wearable communication device.

16. The method of claim 9, wherein the required call-to-action is one of input of a biometric data of the user or a voice input by the user.

* * * * *